US010052916B2

(12) United States Patent
Asano et al.

(10) Patent No.: US 10,052,916 B2
(45) Date of Patent: *Aug. 21, 2018

(54) PNEUMATIC TIRE

(71) Applicant: SUMITOMO RUBBER INDUSTRIES, LTD., Kobe-shi, Hyogo (JP)

(72) Inventors: Kazuo Asano, Kobe (JP); Shintaro Tomita, Kobe (JP); Susumu Tanaka, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 404 days.

This patent is subject to a terminal disclaimer.

(21) Appl. No.: 14/892,902

(22) PCT Filed: May 15, 2014

(86) PCT No.: PCT/JP2014/062904
§ 371 (c)(1),
(2) Date: Nov. 20, 2015

(87) PCT Pub. No.: WO2014/188938
PCT Pub. Date: Nov. 27, 2014

(65) Prior Publication Data
US 2016/0082775 A1 Mar. 24, 2016

(30) Foreign Application Priority Data
May 21, 2013 (JP) .................. 2013-106756

(51) Int. Cl.
*B60C 3/00* (2006.01)
*B60C 3/04* (2006.01)
(Continued)

(52) U.S. Cl.
CPC .................. *B60C 3/04* (2013.01); *B60C 9/20* (2013.01); *B60C 11/0083* (2013.01);
(Continued)

(58) Field of Classification Search
CPC .... B60C 3/00; B60C 3/04; B60C 5/00; B29D 30/06
See application file for complete search history.

(56) References Cited

U.S. PATENT DOCUMENTS

2009/0229722 A1 9/2009 Isobe
2010/0282391 A1 11/2010 Ishiyama et al.
2014/0332131 A1 11/2014 Asano et al.

FOREIGN PATENT DOCUMENTS

EP 2 799 259 A1 11/2014
EP 2 965 924 A1 1/2016
(Continued)

OTHER PUBLICATIONS

International Search Report, issued in PCT/JP2014/062904, dated Aug. 19, 2014.
(Continued)

*Primary Examiner* — Justin R Fischer
(74) *Attorney, Agent, or Firm* — Birch, Stewart, Kolasch & Birch, LLP

(57) ABSTRACT

In a tire 2, a difference Fs $(((Dd-De)/W)\times 100)$ in an amount of protrusion is greater than $-0.4$ and less than 0.5. A sum Fa $(((Dd+De)/W)\times 100)$ of amounts of protrusions for a sidewall 6 satisfies mathematical expressions (3) and (4) in which an aspect ratio A is used, and a difference Gs $(((Da-Dh)/W)\times 100)$ in an amount of protrusion for a tread 4 satisfies mathematical expressions (6) and (7).

$$0.02626 \times A - 1.8615 < Fa \quad (3)$$

$$Fa < 0.02626 \times A - 0.6615 \quad (4)$$

(Continued)

$$-0.010819 \times A - 0.084658 < Gs \quad (6)$$

$$Gs < -0.010819 \times A + 0.6713 \quad (7)$$

13 Claims, 7 Drawing Sheets

(51) Int. Cl.
  *B60C 5/00* (2006.01)
  *B60C 11/00* (2006.01)
  *B60C 13/00* (2006.01)
  *B60C 9/20* (2006.01)
  *G01M 17/02* (2006.01)

(52) U.S. Cl.
  CPC ........... *B60C 13/003* (2013.01); *G01M 17/02* (2013.01); *B60C 2009/2022* (2013.01); *B60C 2009/2038* (2013.01)

(56) References Cited

FOREIGN PATENT DOCUMENTS

| | | |
|---|---|---|
| JP | 58-112804 A | 7/1983 |
| JP | 2-106404 A | 4/1990 |
| JP | 2009-214780 A | 9/2009 |
| WO | WO 2009/093326 A1 | 7/2009 |
| WO | WO 2013/111679 A1 | 8/2013 |

OTHER PUBLICATIONS

Written Opinion of the International Searching Authority, issued in PCT/JP2014/062904, dated Aug. 19, 2014.

Extended European Search Report dated Sep. 30, 2016, in European Patent Application No. 14800770.1.

PNEUMATIC TIRE

TECHNICAL FIELD

The present invention relates to pneumatic tires.

BACKGROUND ART

Various pneumatic tires that include treads having improved wear resistance and various pneumatic tires in which tread surfaces include grooves having improved crack resistance, have been suggested.

In JP2-106404, a pneumatic tire is suggested in which a tread includes grooves having crack resistance improved by specifying: a radius of curvature of the tread; and an amount of protrusion of the tread in the case of the tire being inflated with air. For this tire, it is suggested that a difference between an amount of protrusion at the center of the tread and an amount of axially outward protrusion of the tread is set so as to be within a predetermined range. In this tire, change of an amount of protrusion of the tread and change of the radius of curvature of the tread are reduced when a low internal pressure state shifts to a standard internal pressure state.

In JP58-112804, a pneumatic tire is suggested in which a radius of curvature of a tread and a shape of shoulder-side wall portions are specified to improve resistance to uneven wear of the tread, and crack resistance in grooves of the tread. For this tire, it is suggested that a difference between shapes of the tread and the shoulder-side wall portions in the case of the tire being inflated with air, and shapes of the tread and the shoulder-side wall portions in a forming mold for the tire, is set so as to be within a predetermined range. For this tire, change between the shape of the mold for the tire and the shape of the tire inflated with air, is reduced.

CITATION LIST

Patent Literature

Patent Literature 1: JP2-106404
Patent Literature 2: JP58-112804

SUMMARY OF THE INVENTION

Problems to be Solved by the Invention

Components of a pneumatic tire are elastic members. When the tire is inflated with air, stress is generated to change the shape of the tire to a balanced shape. The change of the shape is unavoidable in pneumatic tires. Therefore, the inventers have advanced development of a tire in which its shape is changed so as not to reduce wear resistance, and crack resistance in grooves when the tire is inflated with air.

An object of the present invention is to provide a pneumatic tire that is excellent in resistance to uneven wear, and crack resistance in grooves.

Solution to the Problems

A pneumatic tire according to the present invention includes: a tread having an outer surface that forms a tread surface; a pair of sidewalls that extend almost inward from ends, respectively, of the tread in a radial direction; a carcass that is extended along inner sides of the tread and the sidewalls; and a belt that is disposed outward of the carcass in the radial direction and layered over the carcass. The belt has an inner layer, and an outer layer layered over the inner layer. The tread surface has grooves.

A position, on an equator plane, of the tread surface is represented as a point Pa. Positions, on the tread surface, which are distant from each other by 0.8 times a width Wb, in an axial direction, of a region where the inner layer and the outer layer of the belt are layered over each other, are each represented as a point Ph. Positions, on axially outer side surfaces of the sidewalls, which are distant from each other with a maximum width, are each represented as a point Pe. Positions, on the axially outer side surfaces of the sidewalls, each of which is a midpoint between the point Pa and the point Pe in the radial direction, are each represented as a point Pd. A nominal width is represented as W (mm).

In an internal pressure state where an internal pressure that is 0.05 times a normal internal pressure P has been increased to the normal internal pressure P, an amount of protrusion at the point Pa is represented as an amount of protrusion Da (mm), an amount of protrusion at the point Ph is represented as an amount of protrusion Dh, an amount of protrusion at the point Pd is represented as an amount of protrusion Dd (mm), and an amount of protrusion at the point Pe is represented as an amount of protrusion De (mm), when a difference Fs in the amount of protrusion for each sidewall is obtained according to mathematical expression (1), the difference Fs in the amount of protrusion is greater than −0.4 and less than 0.5, when a sum Fa of the amounts of protrusions for each sidewall is obtained according to mathematical expression (2), the sum Fa of the amounts of protrusions satisfies mathematical expressions (3) and (4) in which an aspect ratio A is used, when a difference Gs in the amount of protrusion for the tread is obtained according to mathematical expression (5), the difference Gs in the amount of protrusion satisfies mathematical expressions (6) and (7).

$$Fs=((Dd-De)/W)\times 100 \qquad (1)$$

$$Fa=((Dd+De)/W)\times 100 \qquad (2)$$

$$0.02626\times A-1.8615<Fa \qquad (3)$$

$$Fa<0.02626\times A-0.6615 \qquad (4)$$

$$Gs=((Da-Dh)/W)\times 100 \qquad (5)$$

$$-0.010819\times A-0.084658<Gs \qquad (6)$$

$$Gs<-0.010819\times A+0.6713 \qquad (7)$$

Preferably, in the tire, the difference Gs in the amount of protrusion satisfies mathematical expressions (8) and (9).

$$-0.010819\times A+0.108321<Gs \qquad (8)$$

$$Gs<-0.010819\times A+0.478321 \qquad (9)$$

Preferably, the tire includes a band disposed outward of the belt in the radial direction and layered over the belt. The band includes a first band, and a second band layered over the first band. The first band includes a cord and a topping rubber. The cord extends substantially in the circumferential direction. The second band includes a cord and a topping rubber. An absolute value of a tilt angle of the cord relative to the equator plane is greater than or equal to 80°, and not greater than 90°.

Preferably, in the tire, the aspect ratio A is 70%. The sum Fa of the amounts of protrusions is greater than −0.02 and less than 1.18. The difference Gs in the amount of protrusion is greater than −0.84 and less than −0.09.

Preferably, in the tire, the aspect ratio A is 40%. The sum Fa of the amounts of protrusions is greater than −0.81 and less than 0.39. The difference Gs in the amount of protrusion is greater than −0.52 and less than 0.24.

A durability evaluation method for a pneumatic tire according to the present invention is a durability evaluation method for a tire which includes: a tread having an outer surface that forms a tread surface; a pair of sidewalls that extend almost inward from ends, respectively, of the tread in a radial direction; a carcass that is extended along inner sides of the tread and the sidewalls; and a belt that is disposed outward of the carcass in the radial direction and layered over the carcass, the belt having an inner layer, and an outer layer layered over the inner layer.

A position, on an equator plane, of the tread surface is represented as a point Pa. Positions, on the tread surface, which are distant from each other by 0.8 times a width Wb, in an axial direction, of a region where the inner layer and the outer layer of the belt are layered over each other, are each represented as a point Ph. Positions, on axially outer side surfaces of the sidewalls, which are distant from each other with a maximum width, are each represented as a point Pe. Positions, on the axially outer side surfaces of the sidewalls, each of which is a midpoint between the point Pa and the point Pe in the radial direction, are each represented as a point Pd. A nominal width is represented as W (mm).

In a case where, in an internal pressure state where an internal pressure that is 0.05 times a normal internal pressure P has been increased to the normal internal pressure P, an amount of protrusion at the point Pa is represented as an amount of protrusion Da (mm), an amount of protrusion at the point Ph is represented as an amount of protrusion Dh, an amount of protrusion at the point Pd is represented as an amount of protrusion Dd (mm), and an amount of protrusion at the point Pe is represented as an amount of protrusion De (mm), wear resistance of the tread and crack resistance in grooves are determined as being good, when a difference Fs in the amount of protrusion for each sidewall is obtained according to mathematical expression (1), and the difference Fs in the amount of protrusion is greater than −0.4 and less than 0.5, when a sum Fa of the amounts of protrusions for each sidewall is obtained according to mathematical expression (2), and the sum Fa of the amounts of protrusions satisfies mathematical expressions (3) and (4) in which an aspect ratio A is used, and when a difference Gs in the amount of protrusion for the tread is obtained according to mathematical expression (5), and the difference Gs in the amount of protrusion satisfies mathematical expressions (6) and (7).

$$Fs = ((Dd-De)/W) \times 100 \tag{1}$$

$$Fa = ((Dd+De)/W) \times 100 \tag{2}$$

$$0.02626 \times A - 1.8615 < Fa \tag{3}$$

$$Fa < 0.02626 \times A - 0.6615 \tag{4}$$

$$Gs = ((Da-Dh)/W) \times 100 \tag{5}$$

$$-0.010819 \times A - 0.084658 < Gs \tag{6}$$

$$Gs < -0.010819 \times A + 0.6713 \tag{7}$$

Preferably, in the durability evaluation method, evaluation is determined as being good when the difference Gs in the amount of protrusion satisfies mathematical expressions (8) and (9).

$$-0.010819 \times A + 0.108321 < Gs \tag{8}$$

$$Gs < -0.010819 \times A + 0.478321 \tag{9}$$

A manufacturing method for a pneumatic tire according to the present invention is a manufacturing method for a tire which includes: a tread having an outer surface that forms a tread surface; a pair of sidewalls that extend almost inward from ends, respectively, of the tread in a radial direction; a carcass that is extended along inner sides of the tread and the sidewalls; and a belt that is disposed outward of the carcass in the radial direction and layered over the carcass, the belt having an inner layer, and an outer layer layered over the inner layer. The manufacturing method includes determining and evaluating durability of a sample tire.

In the determining and evaluating of durability, a position, on an equator plane, of the tread surface is represented as a point Pa, positions, on the tread surface, which are distant from each other by 0.8 times a width Wb, in an axial direction, of a region where the inner layer and the outer layer of the belt are layered over each other, are each represented as a point Ph, positions, on axially outer side surfaces of the sidewalls, which are distant from each other with a maximum width, are each represented as a point Pe, positions, on the axially outer side surfaces of the sidewalls, each of which is a midpoint between the point Pa and the point Pe in the radial direction, are each represented as a point Pd, and a nominal width is represented as W (mm). In a case where, in an internal pressure state where an internal pressure that is 0.05 times a normal internal pressure P has been increased to the normal internal pressure P, an amount of protrusion at the point Pa is represented as an amount of protrusion Da (mm), an amount of protrusion at the point Ph is represented as an amount of protrusion Dh, an amount of protrusion at the point Pd is represented as an amount of protrusion Dd (mm), and an amount of protrusion at the point Pe is represented as an amount of protrusion De (mm), and it is determined that when a difference Fs in the amount of protrusion for each sidewall is obtained according to mathematical expression (1), the difference Fs in the amount of protrusion is greater than −0.4 and less than 0.5, when a sum Fa of the amounts of protrusions for each sidewall is obtained according to mathematical expression (2), the sum Fa of the amounts of protrusions satisfies mathematical expressions (3) and (4) in which an aspect ratio A is used, and when a difference Gs in the amount of protrusion for the tread is obtained according to mathematical expression (5), the difference Gs in the amount of protrusion satisfies mathematical expressions (6) and (7), and wear resistance of the tread and crack resistance in grooves are evaluated based on the determination.

In the manufacturing method, the tire is designed and manufactured based on an evaluation result in the determining and evaluating of durability.

$$Fs = ((Dd-De)/W) \times 100 \tag{1}$$

$$Fa = ((Dd+De)/W) \times 100 \tag{2}$$

$$0.02626 \times A - 1.8615 < Fa \tag{3}$$

$$Fa < 0.02626 \times A - 0.6615 \quad (4)$$

$$Gs = ((Da - Dh)/W) \times 100 \quad (5)$$

$$-0.010819 \times A - 0.084658 < Gs \quad (6)$$

$$Gs < -0.010819 \times A + 0.6713 \quad (7)$$

Advantageous Effects of the Invention

In the pneumatic tire according to the present invention, generation of cracks in groove bottoms is reduced. In the tire, generation of uneven wear of a tread is reduced. In the durability evaluation method according to the present invention, durability of a pneumatic tire can be easily evaluated. In a manufacturing method for a tire according to the present invention, a tire excellent in durability can be easily manufactured.

DESCRIPTION OF EMBODIMENTS

The following will describe in detail the present invention based on preferred embodiments with reference where appropriate to the accompanying drawing.

Figure 1:
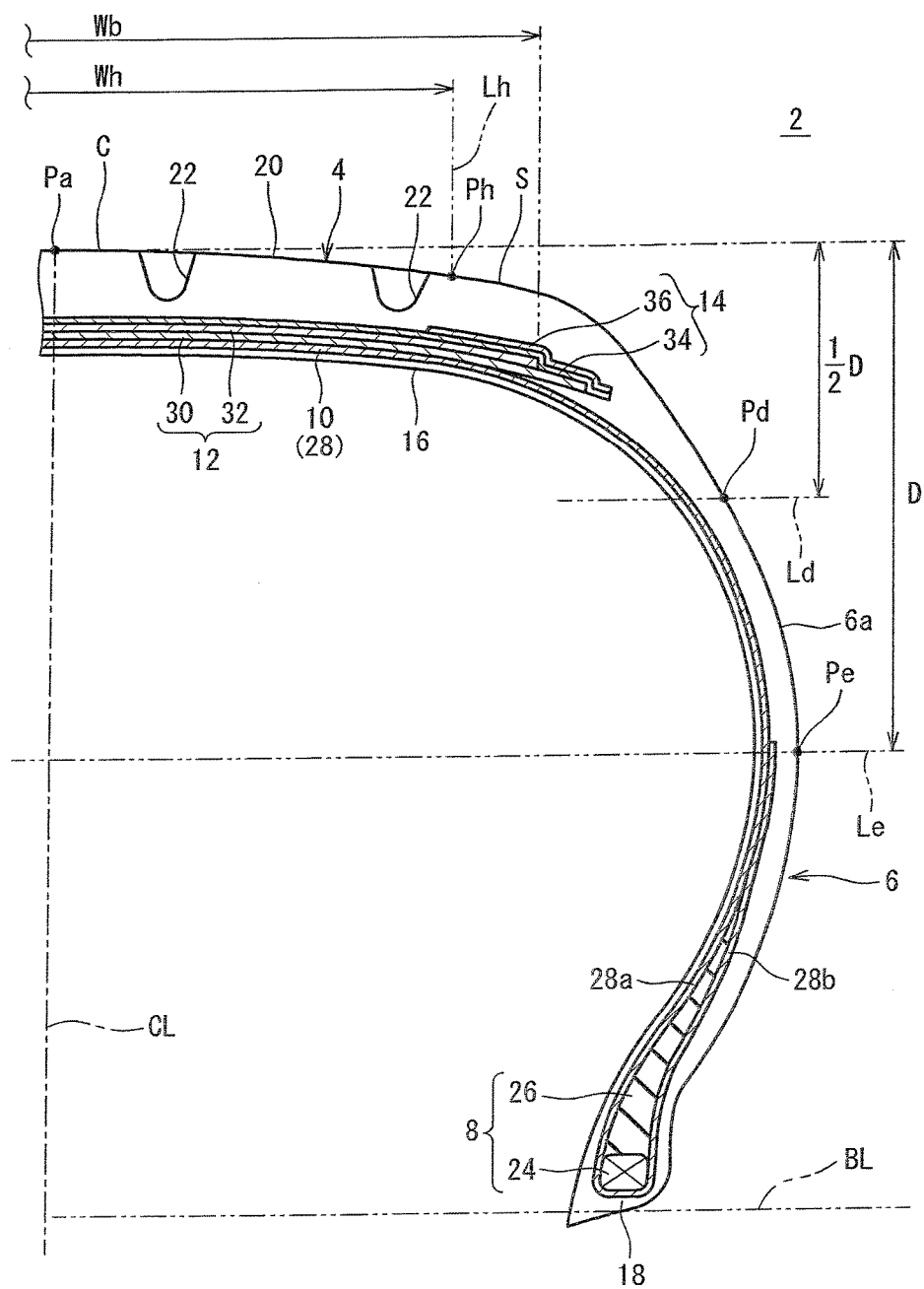
FIG. 1 is a cross-sectional view of a portion of a pneumatic tire according to one embodiment of the present invention.

FIG. 1 illustrates a pneumatic tire 2. In FIG. 1, the up-down direction represents the radial direction of the tire 2, the right-left direction represents the axial direction of the tire 2, and the direction perpendicular to the surface of the sheet represents the circumferential direction of the tire 2. An alternate long and short dash line CL in FIG. 1 represents the equator plane of the tire 2. The tire 2 has a shape which is symmetric about the equator plane except for a tread pattern. An alternate long and two short dashes line BL represents the bead base line of the tire 2.

The tire 2 includes a tread 4, sidewalls 6, beads 8, a carcass 10, a belt 12, a band 14, an inner liner 16, and chafers 18. The tire 2 is of a tubeless type. The tire 2 is mounted to passenger cars.

The tread 4 has a shape that projects outward in the radial direction. The tread 4 has a center region C and shoulder regions S. The center region C is disposed at the center, in the axial direction, of the tire 2. The paired shoulder regions S are disposed outward of the center region C in the axial direction. The tread 4 forms a tread surface 20 that can contact with a road surface. The tread surface 20 has grooves 22 formed therein. A tread pattern is formed by the grooves 22.

The tread 4 includes a base layer and a cap layer, which are not shown. The cap layer is disposed outward of the base layer in the radial direction. The cap layer is layered over the base layer. The base layer is formed of a crosslinked rubber excellent in adhesiveness. A typical base rubber of the base layer is a natural rubber. The cap layer is formed of a crosslinked rubber excellent in wear resistance, heat resistance, and grip performance.

Each sidewall 6 extends from the edge of the tread 4 in almost radially inward direction. The outer ends, in the radial direction, of the sidewalls 6 are joined to the tread 4. The sidewalls 6 are formed of a crosslinked rubber excellent in cut resistance and weather resistance. The sidewalls 6 prevent the carcass 10 from being damaged.

The beads 8 are disposed inward of the sidewalls 6 in the radial direction. Each bead 8 includes a core 24 and an apex 26 that extends outward of the core 24 in the radial direction. The core 24 is ring-shaped, and includes a non-stretchable wound wire. A typical material of the wire is a steel. The apex 26 is tapered outward in the radial direction. The apex 26 is formed of a highly hard crosslinked rubber.

The carcass 10 includes a carcass ply 28. The carcass ply 28 is extended along the tread 4 and the sidewalls 6 on and between the beads 8 on both sides. The carcass ply 28 is turned up around each core 24 from the inner side toward the outer side in the axial direction. By the carcass ply 28 being turned up, the carcass ply 28 includes a main body portion 28a and turned-up portions 28b.

The carcass ply 28 is formed of multiple cords aligned with each other, and a topping rubber. An absolute value of an angle of each cord relative to the equator plane ranges from 75° to 90°. In other words, the carcass 10 forms a radial structure. The cords are formed of an organic fiber. Preferable examples of the organic fiber include polyester fibers, nylon fibers, rayon fibers, polyethylene naphthalate fibers, and aramid fibers. The carcass 10 may be formed of two or more plies.

The belt 12 is disposed inward of the tread 4 in the radial direction. The belt 12 is layered over the carcass 10. The belt 12 reinforces the carcass 10. The belt 12 includes an inner layer 30, and an outer layer 32 disposed outward of the inner layer 30 in the radial direction so as to be layered over the inner layer 30. As is apparent from FIG. 1, the width of the inner layer 30 is slightly greater than the width of the outer layer 32 in the axial direction. Each of the inner layer 30 and the outer layer 32 is formed of multiple cords aligned with each other, and a topping rubber, which are not shown. Each cord is inclined relative to the equator plane. The absolute value of the inclination angle is typically greater than or equal to 10°, and not greater than 35°. A direction in which the cords of the inner layer 30 are inclined relative to the equator plane and a direction in which the cords of the outer layer 32 are inclined relative to the equator plane are opposite to each other. A material of each cord is preferably a steel. For each cord, an organic fiber may be used.

A double-headed arrow Wb in FIG. 1 represents a width of the belt 12. A width Wb of belt 12 is measured as a distance in a straight line in the axial direction of the tire 2. The width Wb is measured as a width of a range in which the inner layer 30 and the outer layer 32 are layered over each other. In the tire 2, the width Wb is measured as a width of the outer layer 32. The width Wb is preferably greater than or equal to 0.58 times the maximum width of the tire 2, and preferably not greater than 0.85 times the maximum width of the tire 2.

The band 14 is disposed outward of the belt 12 in the radial direction. The width of the band 14 is greater than the width of the belt 12 in the axial direction. The band 14 includes a first band 34 and a second band 36. The first band 34 and the second band 36 are each a full band that has a width greater than the width of the belt 12 in the axial direction, and covers the belt 12. The first band 34 is formed of a cord and a topping rubber, which are not shown. The cord of the first band 34 is helically wound. The first band 34 has a so-called jointless structure. The cord of the first band 34 extends substantially in the circumferential direction. An angle of the cord relative to the circumferential direction is less than or equal to 5°, and more preferably less than or equal to 2°.

The second band 36 is formed of a cord and a topping rubber. The cord of the second band 36 extends in the axial direction. An angle, on the equator plane, of the cord of the second band 36 relative to the equator plane is referred to as a tilt angle of the cord of the second band 36. An absolute value θ of the tilt angle of the cord of the second band 36 is greater than or equal to 60°. The absolute value θ thereof is not greater than 90°.

The belt 12 is held by the cord of the first band 34 and the cord of the second band 36, thereby reducing lifting of the belt 12. The cords of the bands are formed of an organic fiber. Preferable examples of the organic fiber include nylon fibers, polyester fibers, rayon fibers, polyethylene naphthalate fibers, and aramid fibers.

In the tire 2, the band 14 may include the first band 34 without including the second band 36. The band 14 includes no edge band. However, the band 14 may include a pair of edge bands instead of the second band 36. The band 14 may include: the first band 34; and a pair of edge bands that are disposed on the axially end portions of the belt 12, and covers the end portions without covering the axially center portion.

The belt 12 and the band 14 form a reinforcing layer. The reinforcing layer may be formed merely by the belt 12.

The inner liner 16 is disposed inward of the carcass 10. The inner liner 16 is formed of a crosslinked rubber. For the inner liner 16, a rubber excellent in airtightness is used. A typical base rubber of the inner liner 16 is an isobutylene-isoprene-rubber or halogenated isobutylene-isoprene-rubber. The inner liner 16 maintains internal pressure of the tire.

The chafers 18 are disposed near the beads 8. When the tire 2 is mounted to a rim, the chafers 18 contact with the rim. Regions near the beads 8 are protected due to the contact. For example, the chafers 18 are formed of a fabric and a rubber impregnated into the fabric.

In FIG. 1, a point Pa represents a point of intersection between the equator plane and the tread surface 20. An alternate long and two short dashes line Lh represents a straight line that extends in the radial direction. A double-headed arrow Wh represents a width between one straight line Lh on one side in the axial direction and the other straight line Lh, on the other side in the axial direction, which is not shown. The width Wh is 0.8 times the width Wb, that is, 0.8·Wb. A point Ph represents a point of intersection between the straight line Lh and the tread surface 20.

An alternate long and two short dashes line Le represents a straight line that extends in the axial direction with the maximum width of the tire 2. The maximum width represents a width, in the axial direction, of the tire between axially outermost positions of the main body portion 28a of the carcass 10. A point Pe represents a point of intersection between the straight line Le and an axially outer side surface 6a of each sidewall 6. The maximum width of the tire 2 is measured as a distance from the point Pe to the point Pe on the other side, which is not shown. A double-headed arrow D represents a distance, in the radial direction, from the point Pa to the point Pe. An alternate long and two short dashes line Ld represents a straight line that extends in the axial direction through the midpoint of the distance D. A point Pd represents a point of intersection between the straight line Ld and the axially outer side surface 6a of each sidewall 6. The point Pd represents the midpoint, in the radial direction, between the point Pa and the point Pe.

Figure 2:
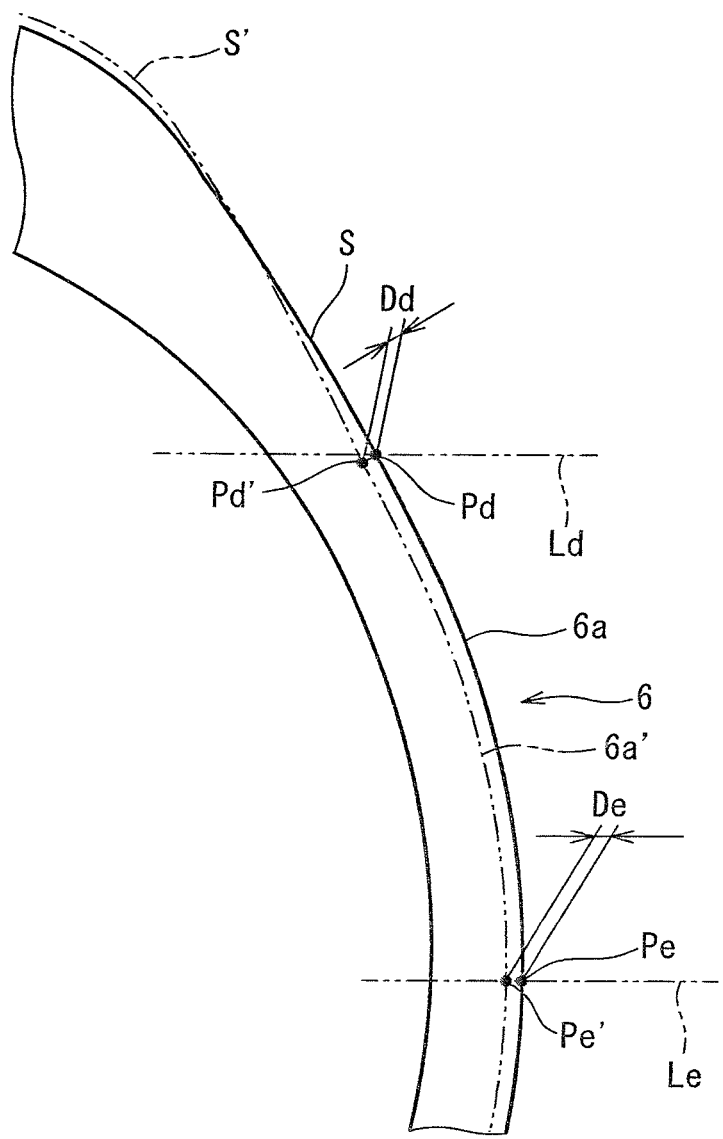
FIG. 2 is an enlarged cross-sectional view of a portion of the tire shown in FIG. 1.

FIG. 2 is an enlarged view of a portion of the tire 2. The axially outer side surface 6a of the tire 2 represents a state where the tire 2 is mounted to a normal rim, and is inflated with air to a normal internal pressure P. An alternate long and two short dashes line 6a' also represents the axially outer side surface of the tire 2. The outer side surface 6a' represents a state where the tire 2 is mounted to a normal rim, and is inflated with air to an air pressure of 0.05·P which is 0.05 times the normal internal pressure P.

A point Pd' represents a point of intersection between the outer side surface 6a' and a normal line to the axially outer side surface 6a at the point Pd. A double-headed arrow Dd represents a distance from the point Pd' to the point Pd. The distance Dd represents an amount of protrusion of the tire 2 at the point Pd. The amount of protrusion Dd represents a distance from the point Pd' to the point Pd in a state where the tire is pressurized to shift from the air pressure of 0.05·P to the air pressure P. The amount of protrusion Dd is represented so as to indicate a plus value in the case of shift in the axially outward direction and indicate a minus value in the case of shift in the axially inward direction.

A point Pe' represents a point of intersection between the straight line Le and the outer side surface 6a'. A double-headed arrow De represents a distance from the point Pe' to the point Pe. The distance De represents an amount of protrusion of the tire 2 at the point Pe. The amount of protrusion De represents a distance from the point Pe' to the point Pe in a state where the tire is pressurized to shift from the air pressure of 0.05·P to the air pressure P. The amount of protrusion De is represented so as to indicate a plus value in the case of shift in the axially outward direction, and indicate a minus value in the case of shift in the axially inward direction.

Figure 3:
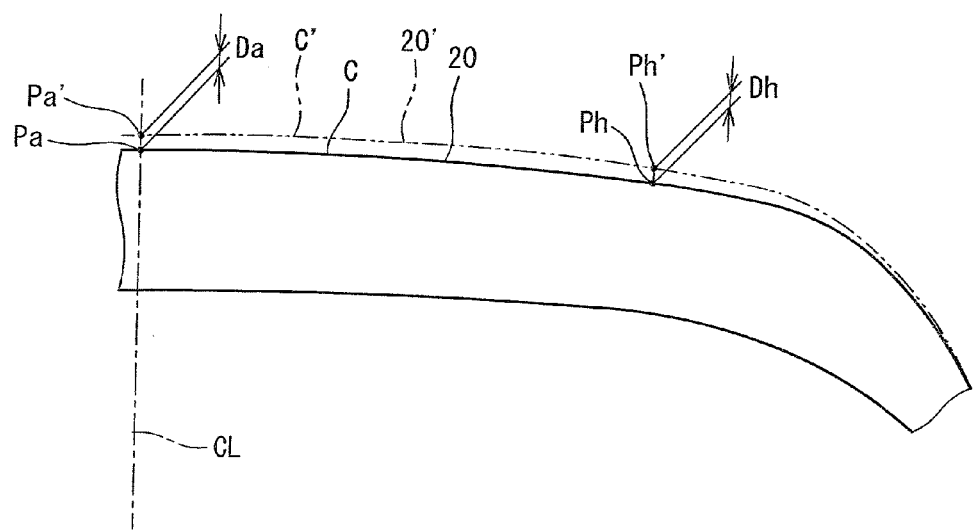
FIG. 3 is an enlarged cross-sectional view of another portion of the tire shown in FIG. 1.

FIG. 3 is an enlarged view of another portion of the tire 2. The tread surface 20 of the tire 2 represents a state where the tire 2 is mounted to a normal rim, and is inflated with air to a normal internal pressure P. An alternate long and two short dashes line 20' also represents the tread surface of the tire 2. The tread surface 20' represents a state where the tire 2 is mounted to a normal rim, and is inflated with air to an air pressure of 0.05·P which is 0.05 times the normal internal pressure P.

A point Pa' represents a point of intersection between the equator plane and the tread surface 20'. A double-headed arrow Da represents a distance from the point Pa' to the point Pa. The distance Da represents an amount of protrusion of the tire 2 at the point Pa. The amount of protrusion Da represents a distance from the point Pa' to the point Pa in a state where the tire is pressurized to shift from the air pressure of 0.05·P to the air pressure P. The amount of protrusion Da is represented so as to indicate a plus value in the case of shift in the radially outward direction, and indicate a minus value in the case of shift in the radially inward direction.

A point Ph' represents a point of intersection between the tread surface 20' and a normal line to the tread surface 20 at the point Ph. A double-headed arrow Dh represents a distance from the point Ph' to the point Ph. The distance Dh represents an amount of protrusion of the tire 2 at the point Ph. The amount of protrusion Dh represents a distance from the point Ph' to the point Ph in a state where the tire is pressurized to shift from the air pressure of 0.05·P to the air pressure P. The amount of protrusion Dh is represented so as to indicate a plus value in the case of shift in the radially outward direction and indicate a minus value in the case of shift in the radially inward direction.

The tire 2 is mounted to a normal rim and is inflated with air to the air pressure of 0.05·P. A profile of the tire 2 under the air pressure of 0.05·P is measured by a profile measurement machine. Further, the tire is inflated with air to the air pressure P. A profile of the tire 2 under the air pressure P is measured by the profile measurement machine. The point Pa, the point Ph, the point Pe, and the point Pd are obtained based on the profile of the tire 2 under the air pressure P. The profile of the tire 2 under the air pressure P and the profile of the tire 2 under the air pressure of 0.05·P are overlaid on each other such that bead positions (rim flange positions) of the profiles are aligned with each other. The point Pa', the point Ph', the point Pe', and the point Pd' are obtained based on the profile of the tire 2 under the air pressure of 0.5·P. Thus, the amount of protrusion Da and the amount of protrusion Dh for the tread 4, and the amount of protrusion Dd and the amount of protrusion De for each sidewall 6 are obtained.

A difference Fs in the amount of protrusion for each sidewall 6 is calculated based on a difference between the amount of protrusion Dd and the amount of protrusion De, and a nominal width W of the tire 2, according to following expression.

$$Fs=((Dd-De)/W) \times 100 \qquad (1)$$

In the tire 2, the difference Fs in the amount of protrusion satisfies the following relational expression.

$$-0.4 < Fs < 0.5$$

When the amount of protrusion Dd is reduced and the amount of protrusion De is increased, openings of the grooves 22 are likely to be expanded. Openings of the grooves 22 that extend in the circumferential direction are likely to be expanded. In particular, openings of the grooves 22 disposed in the shoulder region S are likely to be expanded. When the openings of the grooves 22 are expanded, tensile stress is applied, in the groove width direction, to the bottom portions of the grooves 22 that extend in the circumferential direction. Due to the tensile stress, cracks are likely to be generated in the bottom portions of the grooves 22. The grooves 22 that extend in the circumferential direction include not only main grooves that extend along the full circumference of the tread surface 20 in the circumferential direction, but also grooves that extend partially in the circumferential direction.

In the tire 2, the difference Fs in the amount of protrusion is greater than −0.4. Therefore, the amount of protrusion Dd is less likely to be excessively reduced with respect to the amount of protrusion De. In the tire 2, generation of cracks in the bottom portions of the grooves 22 is reduced.

On the other hand, when the amount of protrusion Dd is increased and the amount of protrusion De is reduced, the shoulder region S of the tread 4 protrudes in the radially outward direction. In the shoulder region S, contact pressure at the tread 4 is enhanced. Wear of the tread surface 20 in the shoulder region S in which the contact pressure is high, is likely to increase.

In the tire 2, the difference Fs in the amount of protrusion is less than 0.5. Therefore, the amount of protrusion Dd is less likely to be excessively increased with respect to the amount of protrusion De. In the tire 2, the shoulder region S is less likely to protrude. In the tire 2, uneven wear of the shoulder region S is reduced.

The difference Fs in the amount of protrusion is represented as a ratio of a difference between the amount of protrusion Dd and the amount of protrusion De relative to the nominal width W of the tire 2. Thus, the difference Fs in the amount of protrusion is applicable also to tires having different nominal widths W.

A sum Fa of the amounts of protrusions for each sidewall 6 is calculated based on a sum of the amount of protrusion Dd and the amount of protrusion De, and the nominal width W of the tire 2, according to the following expression.

$$Fa=((Dd+De)/W) \times 100 \qquad (2)$$

In the tire 2, the aspect ratio is 70%. In the tire 2, the sum Fa of the amounts of protrusions satisfies the following relational expression.

$$-0.02 < Fa < 1.18$$

In the tire 2 having the high aspect ratio, when both the amount of protrusion Dd and the amount of protrusion De are increased, the shoulder region S of the tread 4 is likely to protrude in the radially outward direction. By the protruding of the shoulder region S, expansion of the openings of the grooves 22 is reduced. In the tire 2, the sum Fa of the amounts of protrusions is greater than −0.02. Therefore, expansion of the openings of the grooves 22 is reduced. In the tire 2, generation of cracks in the groove bottoms is reduced. In the description herein, the high aspect ratio represents an aspect ratio that is higher than or equal to 65%.

On the other hand, when both the amount of protrusion Dd and the amount of protrusion De are excessively increased, the shoulder region S of the tread 4 protrudes greatly in the radially outward direction. In the shoulder regions S, contact pressure is enhanced. In the shoulder region S in which the contact pressure is high, the tread surface 20 is likely to be worn. In the tire 2, the sum Fa of the amounts of protrusions is less than 1.18. Therefore, the shoulder region S is less likely to greatly protrude. In the tire 2, uneven wear of the shoulder region S is reduced.

The sum Fa of the amounts of protrusions is also represented as a ratio with respect to the nominal width W of the tire 2. The difference Fa in the amount of protrusion is applicable also to tires having different nominal widths W.

A difference Gs in the amount of protrusion for the tread 4 is calculated based on a difference between the amount of protrusion Da and the amount of protrusion Dh, and the nominal width W of the tire 2, according to following expression.

$$Gs=((Da-Dh)/W) \times 100 \qquad (5)$$

In the tire 2, the difference Gs in the amount of protrusion satisfies the following relational expression.

$$-0.84 < Gs < -0.09$$

When the amount of protrusion Da is reduced and the amount of protrusion Dh is increased, openings of the grooves 22 are likely to be expanded. Openings of the grooves 22 that extend in the circumferential direction are likely to be expanded. In particular, openings of the grooves 22 disposed in the shoulder region S are likely to be expanded. When the openings of the grooves 22 are expanded, tensile stress is applied, in the groove width direction, to the bottom portions of the grooves 22 that extend in the circumferential direction. Due to the tensile stress, cracks are likely to be generated in the bottom portions of the grooves 22. Further, contact pressure at the tread surface 20 in the shoulder region S is enhanced. Uneven wear of the tread surface 20 in the shoulder region S is increased.

In the tire 2, the difference Gs in the amount of protrusion is greater than −0.84. The amount of protrusion Da is less likely to be excessively reduced with respect to the amount of protrusion Dh. In the tire 2, generation of cracks in the bottom portions of the grooves 22 is reduced. Uneven wear of the tread surface 20 in the shoulder region S is reduced.

On the other hand, when the amount of protrusion Da is increased and the amount of protrusion Dh is reduced, the center region C of the tread 4 protrudes in the radially outward direction. In the center region C, contact pressure at the tread 4 is enhanced. When the tire 2 is mounted to a drive wheel, wear is likely to increase at the tread surface 20 in the center region C in which contact pressure is high. When the tire 2 is mounted to a driven wheel (idler wheel), the tread surface 20 in the shoulder region S in which contact pressure is low, is likely to slide. Thus, wear of the tread surface 20 in the shoulder region S is likely to increase.

In the tire 2, the difference Gs in the amount of protrusion is less than −0.09 (−0.086). The amount of protrusion Da is less likely to be excessively increased with respect to the amount of protrusion Dh. In the tire 2, the center region C is less likely to protrude. In the tire 2, uneven wear of the tread surface 20 is reduced.

The difference Gs in the amount of protrusion is also represented as a ratio with respect to the nominal width W of the tire 2. The difference Gs in the amount of protrusion is applicable also to tires having different nominal widths W.

The tire 2 is obtained by vulcanization and molding. After the vulcanization and molding, the tire 2 is contracted due to reduction of temperature. In particular, the tire 2 is contracted in a range from the sidewalls 6 to the beads 8, whereby the outer diameter between the shoulder regions S of the tread surface 20 is likely to be reduced. This contraction also causes contraction of the belt 12 in the radial direction of the tire 2. Due to the contraction, compressive force in the circumferential direction of the tire 2 is applied to the belt 12. Tensile force in the axial direction of the tire 2 is applied to the belt 12. The belt 12 is expanded in the axial direction. Expansion of the belt 12 causes tensile force in the axial direction to be applied to the tread 4. The tensile force causes increase of generation of cracks in the bottom portions of the grooves 22 of the tread 4.

In the tire 2, the cord of the second band 36 extends in the axial direction. Therefore, the tensile force in the tread 4 in the axial direction is reduced. Thus, generation of cracks in the bottom portions of the grooves 22 of the tread 4 is reduced. In this viewpoint, an absolute value θ of the tilt angle of the cord of the second band 36 is preferably greater than or equal to 60°, and more preferably greater than or equal to 80°. On the other hand, a maximum value of the absolute value θ of the angle of the cord is 90°, and the absolute value θ is not greater than 90°.

In the tire 2 having the second band 36, contraction of the shoulder region S of the tread surface 20 in the radial direction is reduced. In the tire 2, when the tire 2 is inflated with air to a normal internal pressure, protrusion of the shoulder region S is reduced. In the tire 2 having the second band 36, the amount of protrusion Dh is less likely to be increased.

In the present invention, the dimensions and angles of components of the tire 2 are measured in a state where the tire 2 is mounted to a normal rim, and inflated with air to a normal internal pressure, unless otherwise specified. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

Figure 4:
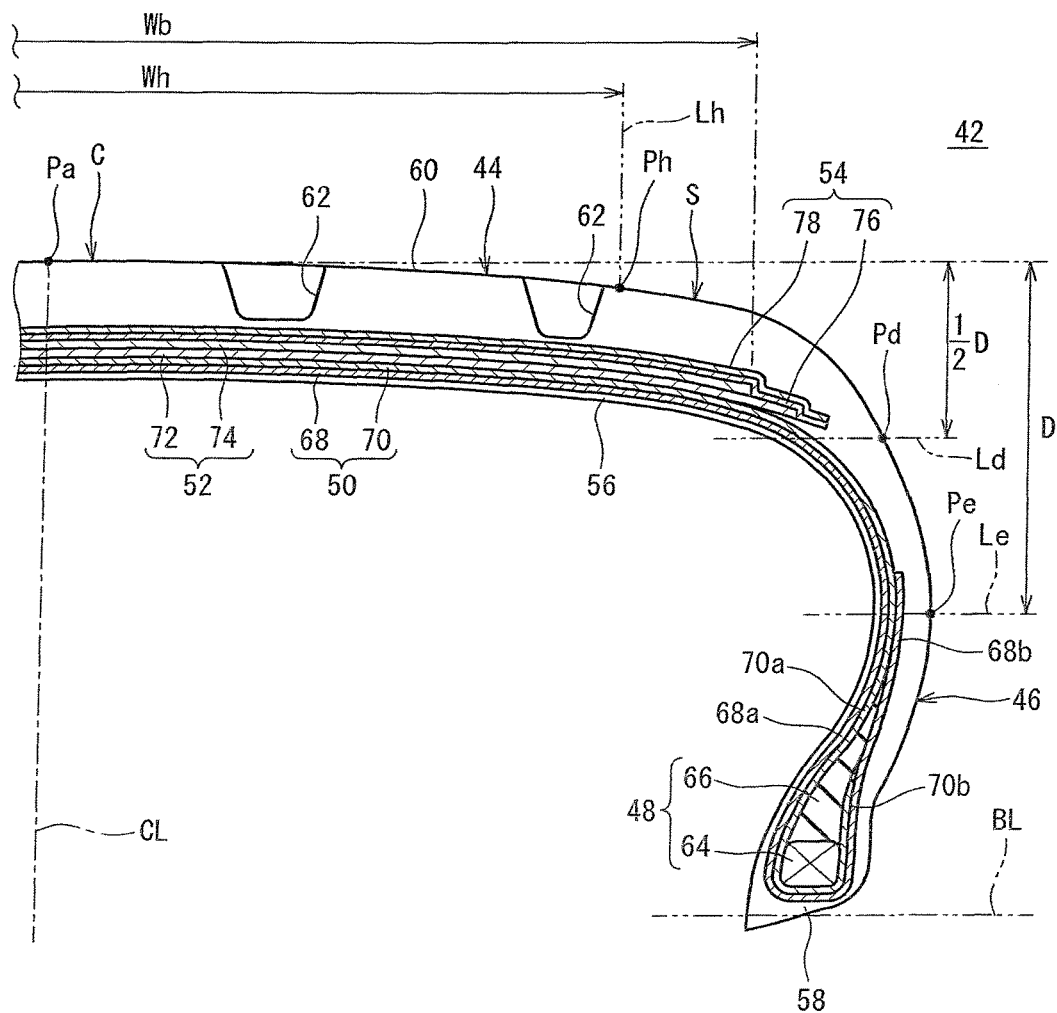
FIG. 4 is a cross-sectional view of a portion of a pneumatic tire according to another embodiment of the present invention.

FIG. 4 illustrates another pneumatic tire 42 according to the present invention. In the description herein, a portion of a structure thereof which is different from that of the tire 2 will be mainly described, and description of the same structure is not given. The tire 42 includes a tread 44, sidewalls 46, beads 48, a carcass 50, a belt 52, a band 54, an inner liner 56, and chafers 58.

The tread 44 forms a tread surface 60 that can contact with a road surface. The tread surface 60 has grooves 62 formed therein. Each bead 48 includes a core 64 and an apex 66 that extends outward of the core 64 in the radial direction.

The carcass 50 includes a first ply 68 and a second ply 70. The first ply 68 and the second ply 70 are extended along the tread 44 and the sidewalls 46 on and between the beads on both sides. The first ply 68 is turned up around each core 64 from the inner side toward the outer side in the axial direction. By the first ply 68 being turned up, the first ply 68 includes a main body portion 68a and turned-up portions 68b. The second ply 70 is turned up around each core 64 from the inner side toward the outer side in the axial direction. By the second ply 70 being turned up, the second ply 70 includes a main body portion 70a and turned-up portions 70b. The ends of the turned-up portions 68b of the first ply 68 are disposed radially outward of the ends of the turned-up portions 70b of the second ply 70.

Each of the carcass plies, that is, each of the first ply 68 and the second ply 70 is formed of multiple cords aligned with each other, and a topping rubber. An absolute value of an angle of each cord relative to the equator plane ranges from 75° to 90°. In other words, the carcass forms a radial structure. The cords are formed of an organic fiber. Preferable examples of the organic fiber include polyester fibers, nylon fibers, rayon fibers, polyethylene naphthalate fibers, and aramid fibers. The carcass may be formed of one ply.

The belt 52 is disposed inward of the tread 44 in the radial direction. The belt 52 is layered over the carcass 50. The belt 52 includes an inner layer 72 and an outer layer 74. Each of the inner layer 72 and the outer layer 74 is formed of multiple cords aligned with each other, and a topping rubber, which are not shown. Each cord is inclined relative to the equator plane. The absolute value of the inclination angle is typically greater than or equal to 10° and not greater than 35°. A direction in which the cords of the inner layer 72 are inclined relative to the equator plane is opposite to a direction in which the cords of the outer layer 74 are inclined relative to the equator plane.

The band 54 is disposed outward of the belt 52 in the radial direction. The width of the band 54 is greater than the width of the belt 52 in the axial direction. The band 54 includes a first band 76 and a second band 78. The first band 76 is formed of a cord and a topping rubber, which are not shown. The cord of the first band 76 is helically wound. The first band 76 has a so-called jointless structure. The cord of the first band 76 extends substantially in the circumferential direction. The second band 78 is formed of a cord and a topping rubber. The cord of the second band 78 extends in the axial direction. The belt 52 and the band 54 form a reinforcing layer.

Also in the tire 42, the difference Fs in the amount of protrusion satisfies the following relational expression.

$$-0.4<Fs<0.5$$

In the tire 42, the difference Fs in the amount of protrusion is less than 0.5. Therefore, the amount of protrusion Dd is less likely to be excessively increased with respect to the amount of protrusion De. In the tire 42, the shoulder region S is less likely to protrude. In the tire 42, uneven wear of the shoulder region S is reduced.

In the tire 42, the difference Fs in the amount of protrusion is greater than −0.4. Therefore, generation of cracks in the bottom portions of the grooves 62 is reduced. In the tire 42, the difference Fs in the amount of protrusion is less than 0.5. Therefore, the shoulder region S is less likely to protrude. In the tire 42, uneven wear of the shoulder region S is reduced.

In the tire 42, an aspect ratio is 40%. In the tire 42, a sum Fa of amounts of protrusions satisfies the following relational expression.

$$-0.81<Fa<0.39$$

In the tire 42 having the low aspect ratio, even when both the amount of protrusion Dd and the amount of protrusion De are increased, protrusion of the shoulder region S of the tread 44 in the radially outward direction is small. An effect of reducing expansion of the openings of the grooves 62 is low. When both the amount of protrusion Dd and the amount of protrusion De are increased, the shoulder region S of the tread 44 is drawn in the axially outward direction. Thus, in the tire 42, openings of the grooves 62 that extend in the circumferential direction are expanded. In the description herein, the low aspect ratio represents an aspect ratio that is less than or equal to 50%.

In the tire 44, the sum Fa of the amounts of protrusions is less than 0.39. Therefore, expansion of the openings of the grooves 62 that extend in the circumferential direction is reduced. In the tire 2, generation of cracks in the groove bottoms is reduced.

In the tire 42, the span of each sidewall 46 in the radial direction is short. Since the span in the radial direction is short, when both the amount of protrusion Dd and the amount of protrusion De are reduced, the shoulder region S of the tread 44 is likely to protrude in the radially outward direction. In the shoulder region S, contact pressure at the tread 44 is enhanced. In the shoulder region S, the tread surface 60 is likely to be worn.

In the tire 42, the sum Fa of the amounts of protrusions is greater than −0.81. Therefore, the shoulder region S is less likely to greatly protrude. In the tire 42, uneven wear of the shoulder region S is reduced.

In the tire 42, the difference Gs in the amount of protrusion satisfies the following relational expression.

$$-0.52<Gs<0.24$$

In the tire 42, the difference Gs in the amount of protrusion is greater than −0.52. Therefore, the amount of protrusion Dh is less likely to be excessively increased with respect to the amount of protrusion Da. In the tire 42, generation of cracks in the bottom portions of the grooves 62 is reduced. Further, uneven wear of the tread surface 60 in the shoulder region S is reduced.

On the other hand, in the tire 42, the difference Gs in the amount of protrusion is less than 0.24. Therefore, the amount of protrusion Da is less likely to be excessively increased with respect to the amount of protrusion Dh. In the tire 42, the center region C is less likely to protrude. In the tire 42, uneven wear of the tread surface 60 is reduced.

The inventors have made various sample tires having an aspect ratio ranging from 40% to 70%. For these tires, a relationship between: the difference Fs in the amount of protrusion, the sum Fa of the amounts of protrusions, and the difference Gs in the amount of protrusion; and generation of cracks in the groove bottoms and generation of uneven wear of the shoulder region S was examined.

Figure 5:
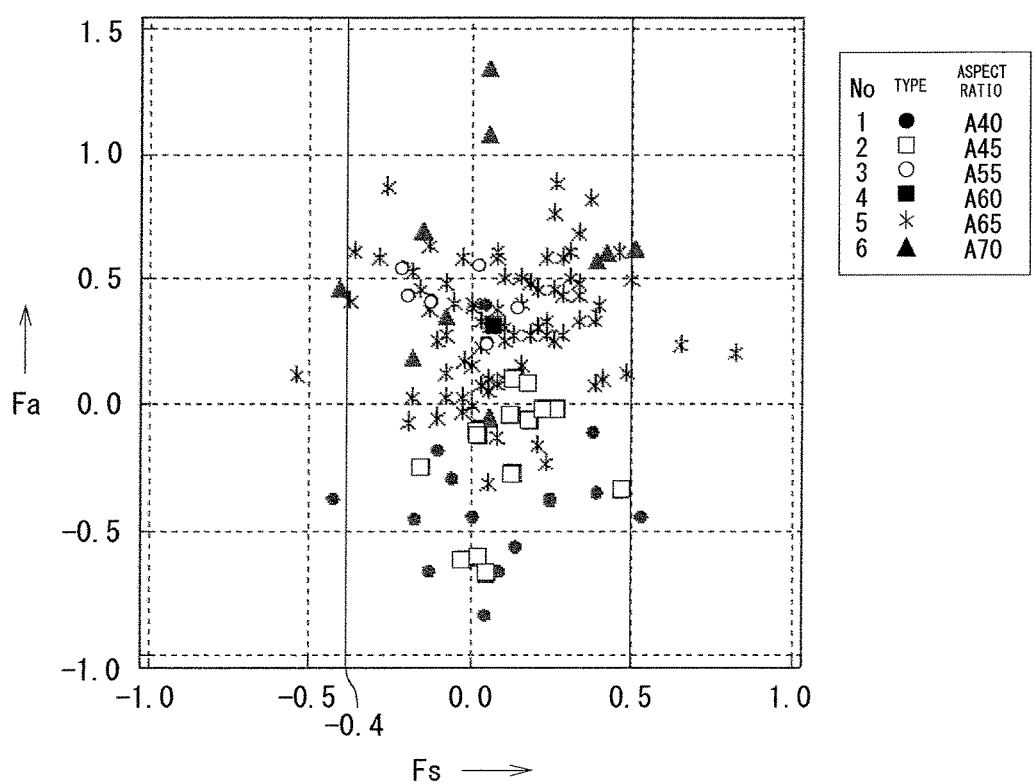
FIG. 5 shows a graph representing a relationship between a difference Fs in the amount of protrusion and a sum Fa of amounts of protrusions for a sidewall.

FIG. 5 shows a graph representing a distribution, of sample tires, based on the sum Fa of the amounts of protrusions and the difference Fs in the amount of protrusion. A40 represents tires having an aspect ratio of 40%, and A45 represents tires having an aspect ratio of 45%. In the below description, similarly, A55, A60, A65, and A70 represent tires having aspect ratios of 55%, 60%, 65%, and 70%, respectively. In the graph, the horizontal axis represents the difference Fs in the amount of protrusion and the vertical axis represents the sum Fa of the amounts of protrusions. It has been confirmed that, among the sample tires, in tires in which the difference Fs in the amount of protrusion is greater than −0.4, cracks in the groove bottoms are less likely to be generated. On the other hand, it has been confirmed that, in tires in which the difference Fs in the amount of protrusion is less than 0.5, uneven wear is less likely to be generated.

When the difference Fs in the amount of protrusion satisfies the following relational expression, generation of cracks in the groove bottoms can be reduced, and generation of uneven wear in the shoulder region can be reduced.

$$-0.4<Fs<0.5$$

Preferable ranges for the sum Fa of the amounts of protrusions and the difference Gs in the amount of protrusion are each different according to the aspect ratio as described for the tire 2 and the tire 42 as examples.

Figure 6:
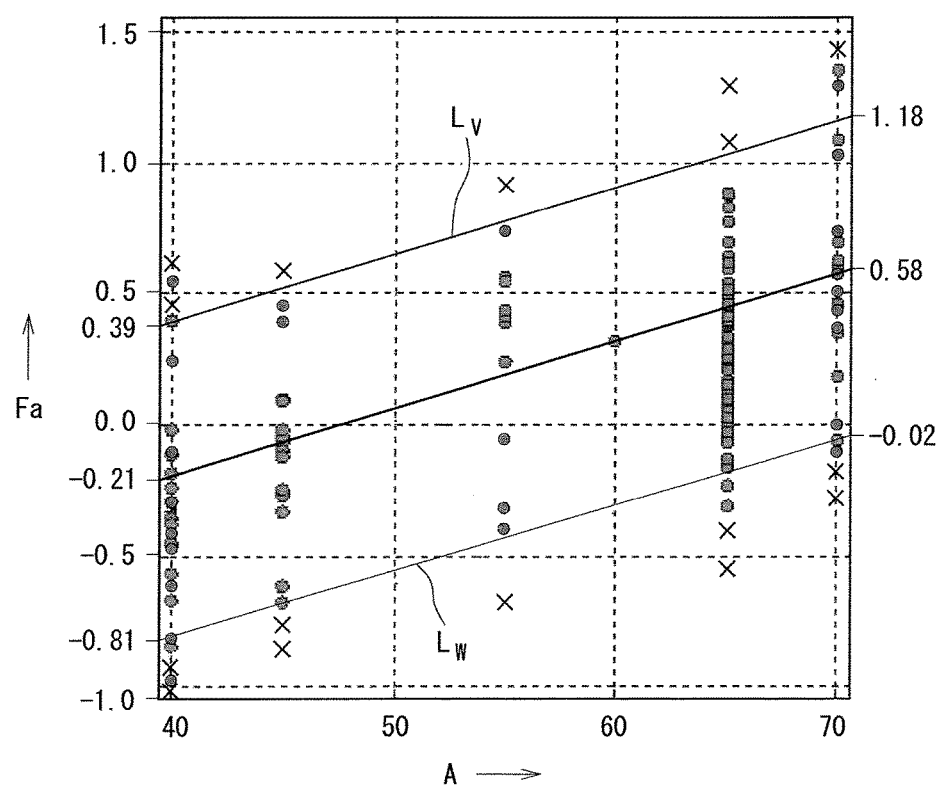
FIG. 6 shows a graph representing a relationship between an aspect ratio and the sum Fa of the amounts of protrusions.

FIG. 6 shows a graph representing a distribution, of sample tires, based on the aspect ratio A and the sum Fa of the amounts of protrusions. In the graph, circle marks represent a distribution of the sample tires in which generation of cracks and generation of uneven wear of the shoulder region S were favorably reduced. In the graph, X marks represent a distribution of the tires in which at least one of cracks and uneven wear of the shoulder region S was unfavorably generated. According to the graph, it has been confirmed that, in the sample tires in which the value Fa is less than values on a straight line Lv and greater than values on a straight line Lw, generation of cracks in the groove bottoms and generation of uneven wear are particularly favorably reduced.

The straight line Lv is represented by the following expression in which A represents an aspect ratio.

$$Fa=0.2626 \times A - 0.6615$$

On the other hand, the straight line Lw is represented by the following expression.

$$Fa=0.2626 \times A - 1.8615$$

In a case where the sum Fa of the amounts of protrusions satisfies the following relational expressions, generation of cracks in the groove bottoms can be reduced and uneven wear of the tread can be reduced.

$$0.02626 \times A - 1.8615 < Fa \qquad (3)$$

$$Fa < 0.02626 \times A - 0.6615 \qquad (4)$$

Figure 7:
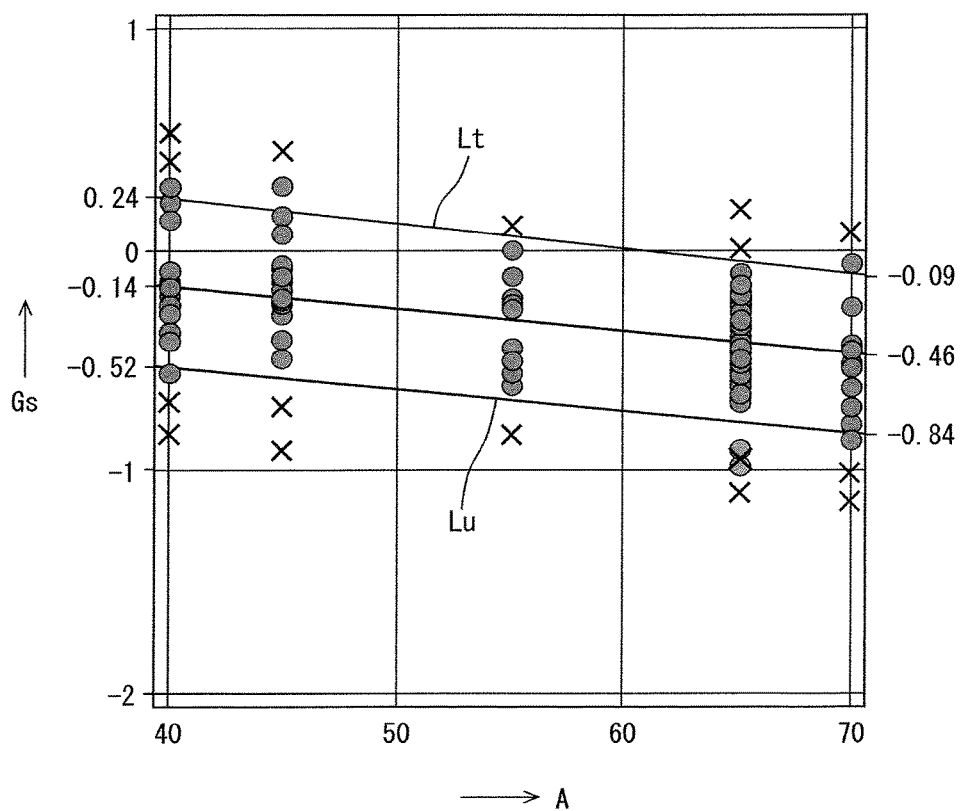
FIG. 7 shows a graph representing a relationship between an aspect ratio and a difference Gs in the amount of protrusion for a tread.

FIG. 7 shows a graph representing a distribution, of sample tires, based on the aspect ratio A and the difference Gs in the amount of protrusion. In the graph, circle marks represent a distribution of the sample tires in which generation of cracks and generation of uneven wear of the shoulder region S were favorably reduced. In the graph, X marks represent a distribution of the tires in which at least one of cracks and uneven wear of the shoulder region S was unfavorably generated. According to the graph, it has been confirmed that, in the sample tires in which the difference Gs in the amount of protrusion represents a value that is less than values on a straight line Lt and greater than values on a straight line Lu, generation of cracks in the groove bottoms and generation of uneven wear are particularly favorably reduced.

The straight line Lt is represented by the following expression in which A represents an aspect ratio.

$$Gs=-0.010819 \times A + 0.6713$$

On the other hand, the straight line Lu is represented by the following expression.

$$Gs=-0.010819 \times A - 0.084658$$

In a case where the difference Gs in the amount of protrusion satisfies the following relational expressions, generation of cracks in the groove bottoms can be reduced and uneven wear of the tread can be reduced.

$$-0.010819 \times A - 0.084658 < Gs \qquad (6)$$

$$Gs < -0.010819 \times A + 0.6713 \qquad (7)$$

In a case where the difference Gs in the amount of protrusion satisfies the following relational expressions, generation of cracks in the groove bottoms can be further reduced and uneven wear of the tread can be further reduced.

$$-0.010819 \times A + 0.108321 < Gs \qquad (8)$$

$$Gs < -0.010819 \times A + 0.478321 \qquad (9)$$

In the tire 2 according to the present invention, since the difference Fs in the amount of protrusion is greater than −0.4 and less than 0.5, generation of cracks in the groove bottoms and uneven wear of the tread 4 are reduced. When the sum Fa of the amounts of protrusions satisfies the above mathematical expressions (3) and (4), generation of cracks in the groove bottoms and uneven wear of the tread 4 can be reduced. Further, when the difference Gs in the amount of protrusion for the tread 4 satisfies the above mathematical expressions (6) and (7), generation of cracks in the groove bottoms and uneven wear of the tread 4 can be reduced. When the difference Gs in the amount of protrusion for the tread 4 satisfies the above mathematical expressions (8) and (9), generation of cracks in the groove bottoms and uneven wear of the tread 4 can be further reduced.

Further, also in the tire 42, when the difference Fs in the amount of protrusion is greater than −0.4 and less than 0.5, the sum Fa of the amounts of protrusions satisfies the above mathematical expressions (3) and (4), and the difference Gs in the amount of protrusion for the tread 44 satisfies the above mathematical expressions (6) and (7), the same effects as for the tire 2 can be obtained. When the difference Gs in the amount of protrusion for the tread 44 satisfies the above mathematical expressions (8) and (9), generation of cracks in the groove bottoms and uneven wear of the tread 44 can be further reduced.

Next, a manufacturing method according to the present invention will be described for the tire 2 as an example. The manufacturing method includes a determination step of evaluating durability of a sample tire. In the determination step, a sample tire for obtaining the tire 2 is prepared. Whether or not the sample tire is good is determined based on the difference Fs in the amount of protrusion, the sum Fa of the amounts of protrusions, and the difference Gs in the amount of protrusion. Based on evaluation results in the determination step, the tire 2 is designed. For example, when the sample tire is determined as being not good, for example, a carcass line is adjusted such that each of the difference Fs in the amount of protrusion, the sum Fa of the amounts of protrusions, and the difference Gs in the amount of protrusion is within a predetermined range.

The carcass line is adjusted by adjusting, for example, a shape of a mold for vulcanization and molding. In the adjustment of the carcass line, for example, a radius of curvature of the carcass line near the point Pd and a radius of curvature of the carcass line near the point Pe are adjusted by the shape of the mold. Thus, a sample tire in which the difference Fs in the amount of protrusion, the sum Fa of the amounts of protrusions, and the difference Gs in the amount of protrusion are good, can be obtained. The tire 2 is manufactured according to the mold for forming the sample tire. In this manner, the tire 2 is designed and manufactured according to the sample tire, thereby facilitating manufacturing of the tire 2 excellent in durability.

In the description herein, as a method for adjusting each of the difference Fs in the amount of protrusion, the sum Fa of the amounts of protrusions, and the difference Gs in the amount of protrusion so as to be within the predetermined range, a method for adjusting the carcass line is described as an exemplary method. However, the adjustment method is not limited to the above-described exemplary method. For example, the adjustment can be made by adjusting a thickness of rubber of the sidewall 6 near the point Pd and a thickness of rubber of the sidewall 6 near the point Pe. Further, as a method for adjusting each of the difference Fs in the amount of protrusion, the sum Fa of the amounts of protrusions, and the difference Gs in the amount of protrusion so as to be within the predetermined range, the structure of the band 14 of the tire 2 may be changed.

Further, an exemplary evaluation method according to the present invention will be described for the tire 2 as an example. The evaluation method includes a step of obtaining a tire assembly, a low internal pressure step, a normal internal pressure step, and a determination step.

In the step of obtaining a tire assembly, the tire 2 is mounted to a normal rim, to obtain a tire assembly.

In the low internal pressure step, the tire assembly is inflated with air to an air pressure of 0.05·P, as an internal pressure, which is 0.05 times the normal internal pressure P. In a state where the tire assembly has been inflated with air to the air pressure of 0.05·P, a profile of the tire 2 is obtained.

In the normal internal pressure step, after the low internal pressure step, the tire assembly is inflated with air to the normal internal pressure. In a state where the tire assembly has been inflated with air to the normal internal pressure P, a profile of the tire 2 is obtained.

In the determination step, positions of the point Pa, the point Ph, the point Pd, and the point Pe are obtained based on the profile obtained in the normal internal pressure step. Further, positions of the point Pa', the point Ph', the point Pd', and the point Pe' are obtained based on the profile obtained in the low internal pressure step. The amounts of protrusions Da and Dh for the tread 4 and the amounts of protrusions De and Dd for each sidewall 6 are calculated. Next, the difference Gs in the amount of protrusion for the tread 4, and the difference Fs in the amount of protrusion and the sum Fa of the amounts of protrusions for each sidewall 6 are calculated. Whether or not each of the difference Fs in the amount of protrusion, the sum Fa of the amounts of protrusions, and the difference Gs in the amount of protrusion is within a predetermined range is determined for evaluation. When the difference Fs, the sum Fa, and the difference Gs are each within the predetermined range, the evaluation result is determined as being good. When each of the difference Fs, the sum Fa, and the difference Gs is not within the predetermined range, the evaluation result is determined as being not good.

In the evaluation method, durability of the tire 2 can be efficiently determined in terms of generation of cracks in the bottom portions of the grooves 22, and generation of uneven wear of the tread 4.

EXAMPLES

Hereinafter, effects of the present invention will become apparent according to examples. However, the present invention should not be restrictively construed based on the description of examples.

Band structures of examples and comparative examples described below are indicated in tables with the use of reference characters. The reference characters represent the following structures.

"1F+1F'": structure where two full bands are used, that is, one full band that has a cord extending in the circumferential direction, and one full band that has a cord extending in the axial direction, are used.

"1F": structure where one full band is used, that is, one full band that has a cord extending in the circumferential direction, is used.

"1E+1F": structure where a pair of edge bands each of which has a cord extending in the circumferential direction, and one full band that has a cord extending in the circumferential direction, are used.

Example 1

A tire having the fundamental structure shown in FIG. 1 was produced as a sample of a tire. The size of the tire was "185/70R14". That is, the nominal width W of the tire was 185 (mm), and the aspect ratio A thereof was 70%. The tire was mounted to a normal rim of 14×5.5J. The tire was inflated with air to an internal pressure of 12 kPa. Thereafter, the tire was inflated with air to the normal internal pressure of 240 kPa. The amount of protrusion Da (mm), the amount of protrusion Dh (mm), the amount of protrusion Dd (mm), the amount of protrusion De (mm), the difference Gs in the amount of protrusion, the difference Fs in the amount of protrusion, and the sum Fa of the amounts of protrusions, were obtained. The results are indicated in Table 1.

Example 2 to 9 and Comparative Example 1 to 8

Tires were produced as samples of tires in the same manner as for example 1 except that band structures were different and carcass lines were adjusted. For the tires, the amounts of protrusions (Da (mm), Dh (mm), Dd (mm), and De (mm)), the difference Gs in the amount of protrusion, the difference Fs in the amount of protrusion, and the sum Fa of the amounts of protrusions, were obtained. The results are indicated in Table 1 to table 3.

The tire of example 2 and the tire of example 1 were obtained in the same manner except that the band structures were different. Similarly, the tire of example 4 and the tire of comparative example 2, the tire of example 5 and the tire of comparative example 4, the tire of example 6 and the tire of comparative example 3, and the tire of example 7 and the tire of comparative example 1 were each obtained in the same manner except for the band structure.

Example 10

A tire having the fundamental structure shown in FIG. 4 was produced as a sample of a tire. The size of the tire was "225/40R18". That is, the nominal width W of the tire was 225 (mm), and the aspect ratio A thereof was 40%. The tire was mounted to a normal rim of 18×8J. The tire was inflated with air to an internal pressure of 12 kPa. Thereafter, the tire was inflated with air to the normal internal pressure of 240 kPa. The amount of protrusion Da (mm) and the amount of protrusion Dh (mm) for a tread, and the amount of protrusion Dd (mm) and the amount of protrusion De (mm) for a sidewall, were obtained. The difference Gs in the amount of protrusion, the difference Fs in the amount of protrusion, and the sum Fa of the amounts of protrusions, were obtained. The results are indicated in Table 4.

Example 11 to 18 and Comparative Example 9 to 16

Tires were produced as samples of tires in the same manner as for example 10 except that band structures were different and the carcass lines were adjusted. For the tires, the amounts of protrusions (Da (mm), Dh (mm), Dd (mm), and De (mm)), the difference Gs in the amount of protrusion, the difference Fs in the amount of protrusion, and the sum Fa of the amounts of protrusions, were obtained. The results are indicated in Table 4 to Table 6.

The tire of example 10 and the tire of example 11 were obtained in the same manner except that the band structures were different. Similarly, the tire of example 13 and the tire of comparative example 10, the tire of example 14 and the tire of comparative example 12, the tire of example 15 and the tire of comparative example 11, and the tire of example 16 and the tire of comparative example 9 were each obtained in the same manner except for the band structure.

[Evaluation for Expansion of Cut Opening]

The tires produced as the samples of tires were mounted to the normal rims, to obtain tire assemblies. Each tire assembly was inflated with air to the normal internal pressure. Bottoms of the main grooves formed in the shoulder region in the circumferential direction in each tire were cut in the circumferential direction. A razor blade having a thickness of 0.25 mm was used to cut the bottoms of the main grooves by a depth of 2 mm and a length of 8 mm. Shapes of the cut openings were taken and an amount of expansion of the cut opening was measured. The measurement results are indicated as indexes in Table 1 to Table 6. The less the amount of expansion of the cut opening is, the greater the index is. The greater the index is, the less generation of cracks is.

[Evaluation for Wear of Shoulder Region]

The tires produced as the samples of tires were mounted to the normal rims, to obtain tire assemblies. Each tire assembly was inflated with air to the normal internal pressure. Each tire assembly was mounted to a bench measurement device for measuring wear energy. The tire assembly was set so as to be rotatable. A slip angle was set as 1°. The tire was under a load that was 80% of the maximum load in the load index standard. The tire was settled on a setting table of the bench measurement device for measuring wear energy. Thus, wear energy of each tire in a turning state was measured.

In the measurement of wear energy, a wear energy Es in the shoulder region on the outer side in the turning radius direction and a wear energy Ec at the center region were measured. A wear energy ratio (Es/Ec) of the wear energy Es to the wear energy Ec was obtained. As the wear energy ratio (Es/Ec) is increased, the shoulder region is more likely to be worn as compared to the center region, and uneven wear is more likely to increase. The wear energy ratio (Es/Ec) is indicated as an index and the results are indicated in Table 1 to Table 6. The less the wear energy ratio (Es/Ec) is, the greater the index is. The greater the index is, the less generation of uneven wear of the shoulder region is.

TABLE 1

Evaluation results

|  | Ex. 1 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Da (mm) | 0.48 | 0.12 | 0.78 | 0.24 | 0.66 | 0.84 | 0.06 |
| Dh (mm) | 1.56 | 1.70 | 1.02 | 1.56 | 1.14 | 1.92 | 1.02 |
| Dd (mm) | 0.30 | 0.15 | 1.15 | 0.15 | 1.15 | 0 | 1.3 |
| De (mm) | 0.40 | 0.90 | 0.20 | 0.95 | 0.20 | −0.1 | 1.2 |
| Gs | −0.58 | −0.85 | −0.06 | −0.71 | −0.26 | −0.58 | −0.52 |
| Fs | −0.05 | −0.41 | 0.51 | −0.43 | 0.51 | 0.05 | 0.05 |
| Fa | 0.38 | 0.57 | 0.73 | 0.59 | 0.73 | −0.05 | 1.35 |
| Band structure | 1F + 1F' | 1E + 1F | 1E + 1F | 1E + 1F | 1E + 1F | 1E + 1F | 1E + 1F |
| Expansion of cut in groove | 8.2 | 6.6 | 8.8 | 6.7 | 8.8 | 6.7 | 8.3 |
| Wear at shoulder region | 9.3 | 6.7 | 6.8 | 7.4 | 7.4 | 7.0 | 6.5 |

TABLE 2

Evaluation results

|  | Ex. 2 | Ex. 3 | Ex. 4 | Ex. 5 | Ex. 6 | Ex. 7 |
|---|---|---|---|---|---|---|
| Da (mm) | 0.54 | 0.12 | 0.78 | 0.66 | 0.18 | 0.06 |
| Dh (mm) | 1.8 | 1.08 | 1.32 | 1.35 | 1.32 | 1.38 |
| Dd (mm) | 0.35 | 1.05 | 0.95 | 0.95 | 0.10 | 0.10 |
| De (mm) | 0.50 | 0.95 | 0.10 | 0.10 | 0.80 | 0.80 |
| Gs | −0.68 | −0.52 | −0.29 | −0.37 | −0.62 | −0.71 |
| Fs | −0.08 | 0.05 | 0.46 | 0.46 | −0.38 | −0.38 |
| Fa | 0.46 | 1.08 | 0.57 | 0.57 | 0.49 | 0.49 |
| Band structure | 1E + 1F | 1E + 1F | 1F | 1F | 1F + 1F' | 1F + 1F' |
| Expansion of cut in groove | 7.5 | 8.3 | 8.8 | 8.6 | 8.0 | 6.9 |
| Wear at shoulder region | 7.9 | 7.8 | 7.5 | 8 | 8.6 | 7.4 |

TABLE 3

Evaluation results

|  | Comp. Ex. 7 | Ex. 8 | Ex. 9 | Comp. Ex. 8 |
|---|---|---|---|---|
| Da (mm) | 0.78 | 0.78 | 0.06 | 0 |
| Dd (mm) | 1.74 | 1.92 | 1.02 | 0.84 |
| Dd (mm) | −0.1 | 0.0 | 0.95 | 1.2 |
| De (mm) | −0.1 | 0.0 | 0.95 | 1.2 |
| Gs | −0.52 | −0.62 | −0.52 | −0.45 |
| Fs | 0 | 0 | 0 | 0 |
| Fa | −0.11 | 0.0 | 1.03 | 1.30 |

TABLE 3-continued

Evaluation results

|  | Comp. Ex. 7 | Ex. 8 | Ex. 9 | Comp. Ex. 8 |
|---|---|---|---|---|
| Band structure | 1F | 1F | 1F + 1F' | 1F + 1F' |
| Expansion of cut in groove | 6.9 | 7.9 | 8.0 | 8.2 |
| Wear at shoulder region | 6.9 | 8 | 8.1 | 6.8 |

TABLE 4

Evaluation results

|  | Ex. 10 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|
| Da (mm) | 0.98 | 0.62 | 1.28 | 0.74 | 1.16 | 1.34 | 0.56 |
| Dh (mm) | 1.55 | 1.88 | 0.63 | 1.65 | 0.86 | 1.91 | 0.95 |
| Dd (mm) | −0.74 | −0.81 | 0.46 | −0.81 | 0.46 | −0.94 | 0.89 |
| De (mm) | −0.61 | 0.17 | −0.68 | 0.17 | −0.68 | −1.05 | 0.78 |
| Gs | −0.25 | −0.56 | 0.29 | −0.41 | 0.13 | −0.25 | −0.17 |
| Fs | −0.06 | −0.44 | 0.51 | −0.44 | 0.51 | 0.05 | 0.05 |

TABLE 4-continued

Evaluation results

|  | Ex. 10 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|
| Fa | −0.60 | −0.29 | −0.10 | −0.29 | −0.10 | −0.88 | 0.75 |
| Band structure | 1F + 1F' | 1E + 1F | 1E + 1F | 1E + 1F | 1E + 1F | 1E + 1F | 1E + 1F |
| Expansion of cut in groove | 8.2 | 6.6 | 8.8 | 6.9 | 8.8 | 7.2 | 8.3 |
| Wear at shoulder region | 9.3 | 6.6 | 6.8 | 7.1 | 7.4 | 7.9 | 6.8 |

TABLE 5

Evaluation results

|  | Ex. 11 | Ex. 12 | Ex. 13 | Ex. 14 | Ex. 15 | Ex. 16 |
|---|---|---|---|---|---|---|
| Da (mm) | 1.04 | 0.62 | 1.28 | 1.16 | 0.68 | 0.56 |
| Dh (mm) | 1.87 | 1.01 | 1.07 | 1.16 | 1.33 | 1.47 |
| Dd (mm) | −0.56 | 0.54 | 0.19 | 0.19 | −0.97 | −0.97 |
| De (mm) | −0.37 | 0.43 | −0.83 | −0.83 | −0.10 | −0.10 |
| Gs | −0.37 | −0.17 | 0.10 | 0 | −0.29 | −0.41 |
| Fs | −0.09 | 0.05 | 0.45 | 0.45 | −0.38 | −0.38 |
| Fa | −0.41 | 0.43 | −0.29 | −0.29 | −0.47 | −0.47 |
| Band structure | 1E + 1F | 1E + 1F | 1F | 1F | 1F + 1F' | 1F + 1F' |
| Expansion of cut in groove | 7.5 | 8.3 | 8.7 | 8.6 | 7.9 | 7.3 |
| Wear at shoulder region | 8.2 | 7.8 | 7.5 | 8 | 8.6 | 7.4 |

TABLE 6

Evaluation results

|  | Comp. Ex. 15 | Ex. 17 | Ex. 18 | Comp. Ex. 16 |
|---|---|---|---|---|
| Da (mm) | 1.28 | 1.28 | 0.56 | 0.50 |
| Dh (mm) | 1.67 | 1.93 | 0.95 | 0.72 |
| Dd (mm) | −1.10 | −0.91 | 0.27 | 0.62 |
| De (mm) | −1.09 | −0.90 | 0.28 | 0.63 |
| Gs | −0.17 | −0.29 | −0.17 | −0.10 |
| Fs | 0 | 0 | 0 | 0 |
| Fa | −0.97 | −0.81 | 0.25 | 0.56 |
| Band structure | 1F | 1F | 1F + 1F' | 1F + 1F' |
| Expansion of cut in groove | 6.9 | 7.9 | 8.3 | 8.2 |
| Wear at shoulder region | 7.2 | 8.0 | 8.0 | 6.7 |

In the tires in which the difference Gs in the amount of protrusion for the tread satisfies the above-described mathematical expressions (8) and (9), both crack resistance in groove bottoms and reduction in uneven wear of the tread are more excellent in a well-balanced manner as compared to the tires that satisfy the above-described mathematical expressions (6) and (7). This is indicated in examples 4 to 7 and examples 13 to 16.

In the tires having the band structure of "1F", pressing of the tread in the shoulder region is reduced as compared to the tires having the band structure of "1E+1F". In the tires having the band structure of "1F", a radius of curvature is likely to increase as compared to the tires having the band structure of "1E+1F". Thus, wear at the shoulder region at the time of braking can be reduced. This is indicated in comparison between comparative example 2 and example 4, comparison between comparative example 4 and example 5, comparison between comparative example 10 and example 13, and comparison between comparative example 12 and example 14.

In the tires having the band structure of "1F+1F'", the amounts of protrusions (Da, Dh, Dd, and De) are reduced as compared to the tires having the band structure of "1E+1F". Thus, crack resistance in the groove bottoms is improved. This is indicated in comparison between example 1 and example 2, comparison between example 6 and comparative example 3, comparison between example 7 and comparative example 1, comparison between example 10 and example 11, comparison between example 15 and comparative example 11, and comparison between example 16 and comparative example 9.

As indicated in Table 1 to Table 6, evaluations are higher in the tires according to examples than in the tires according to comparative examples. The evaluation results clearly indicate that the present invention is superior.

INDUSTRIAL APPLICABILITY

The tire and the method for testing durability of the tire as described above are also applicable to various pneumatic tires for use in passenger cars, lightweight trucks, small trucks, trucks, buses, two-wheeled automotive vehicles, and to durability tests for the pneumatic tires.

DESCRIPTION OF THE REFERENCE CHARACTERS 2, 42 . . . tire
4, 44 . . . tread
6, 46 . . . sidewall
8, 48 . . . bead
10, 50 . . . carcass
12, 52 . . . belt
14, 54 . . . band
16, 56 . . . inner liner
18, 58 . . . chafer
20, 60 . . . tread surface
22, 62 . . . groove
24, 64 . . . core
26, 66 . . . apex
28 . . . carcass ply
30, 72 . . . inner layer
32, 74 . . . outer layer
34, 76 . . . first band 36, 78 . . . second band
68 . . . first ply
70 . . . second ply

The invention claimed is:
1. A pneumatic tire comprising:
a tread having an outer surface that forms a tread surface;
a pair of sidewalls that extend almost inward from ends, respectively, of the tread in a radial direction;
a carcass that is extended along inner sides of the tread and the sidewalls; and
a belt that is disposed outward of the carcass in the radial direction and layered over the carcass, wherein
the belt has an inner layer, and an outer layer layered over the inner layer,
the tread surface has grooves,
a position, on an equator plane, of the tread surface is represented as a point Pa,
positions, on the tread surface, which are distant from each other by 0.8 times a width Wb, in an axial direction, of a region where the inner layer and the outer layer of the belt are layered over each other, are each represented as a point Ph,
positions, on axially outer side surfaces of the sidewalls, which are distant from each other with a maximum width, are each represented as a point Pe,
positions, on the axially outer side surfaces of the sidewalls, each of which is a midpoint between the point Pa and the point Pe in the radial direction, are each represented as a point Pd,
a nominal width is represented as W (mm),
in an internal pressure state where an internal pressure that is 0.05 times a normal internal pressure P has been increased to the normal internal pressure P, an amount of protrusion at the point Pa is represented as an amount of protrusion Da (mm), an amount of protrusion at the point Ph is represented as an amount of protrusion Dh, an amount of protrusion at the point Pd is represented as an amount of protrusion Dd (mm), and an amount of protrusion at the point Pe is represented as an amount of protrusion De (mm),
when a difference Fs in the amount of protrusion for each sidewall is obtained according to mathematical expression (1), the difference Fs in the amount of protrusion is greater than −0.4 and less than 0.5,
when a sum Fa of the amounts of protrusions for each sidewall is obtained according to mathematical expression (2), the sum Fa of the amounts of protrusions satisfies mathematical expressions (3) and (4) in which an aspect ratio A is used,
when a difference Gs in the amount of protrusion for the tread is obtained according to mathematical expression (5), the difference Gs in the amount of protrusion satisfies mathematical expressions (6) and (7)

$$Fs=((Dd-De)/W)\times 100 \qquad (1)$$

$$Fa=((Dd+De)/W)\times 100 \qquad (2)$$

$$0.02626\times A-1.8615<Fa \qquad (3)$$

$$Fa<0.02626\times A-0.6615 \qquad (4)$$

$$Gs=((Da-Dh)/W)\times 100 \qquad (5)$$

$$-0.010819\times A-0.084658<Gs \qquad (6)$$

$$Gs<-0.010819\times A+0.6713 \qquad (7).$$

2. The pneumatic tire according to claim 1, wherein the difference Gs in the amount of protrusion satisfies mathematical expressions (8) and (9)

$$-0.010819\times A+0.108321<Gs \qquad (8)$$

$$Gs<-0.010819\times A+0.478321 \qquad (9).$$

3. The tire according to claim 1, comprising
a band disposed outward of the belt in the radial direction and layered over the belt, wherein
the band includes a first band, and a second band layered over the first band,
the first band includes a cord and a topping rubber, and the cord extends substantially in the circumferential direction, and
the second band includes a cord and a topping rubber, and an absolute value of a tilt angle of the cord relative to the equator plane is greater than or equal to 80°, and not greater than 90°.

4. The tire according to claim 1, wherein
the aspect ratio A is 70%,
the sum Fa of the amounts of protrusions is greater than −0.02 and less than 1.18, and
the difference Gs in the amount of protrusion is greater than −0.84 and less than −0.09.

5. The tire according to claim 1, wherein
the aspect ratio A is 40%,
the sum Fa of the amounts of protrusions is greater than −0.81 and less than 0.39, and
the difference Gs in the amount of protrusion is greater than −0.52 and less than 0.24.

6. A durability evaluation method for a tire which comprises: a tread having an outer surface that forms a tread surface; a pair of sidewalls that extend almost inward from ends, respectively, of the tread in a radial direction; a carcass that is extended along inner sides of the tread and the sidewalls; and a belt that is disposed outward of the carcass in the radial direction and layered over the carcass, the belt having an inner layer, and an outer layer layered over the inner layer, wherein
a position, on an equator plane, of the tread surface is represented as a point Pa,
positions, on the tread surface, which are distant from each other by 0.8 times a width Wb, in an axial direction, of a region where the inner layer and the outer layer of the belt are layered over each other, are each represented as a point Ph,
positions, on axially outer side surfaces of the sidewalls, which are distant from each other with a maximum width, are each represented as a point Pe,
positions, on the axially outer side surfaces of the sidewalls, each of which is a midpoint between the point Pa and the point Pe in the radial direction, are each represented as a point Pd,
a nominal width is represented as W (mm),
in a case where, in an internal pressure state where an internal pressure that is 0.05 times a normal internal pressure P has been increased to the normal internal pressure P, an amount of protrusion at the point Pa is represented as an amount of protrusion Da (mm), an amount of protrusion at the point Ph is represented as an amount of protrusion Dh, an amount of protrusion at the point Pd is represented as an amount of protrusion Dd (mm), and an amount of protrusion at the point Pe is represented as an amount of protrusion De (mm),
wear resistance of the tread and crack resistance in grooves are determined as being good, when a difference Fs in the amount of protrusion for each sidewall is obtained according to mathematical expression (1), and the difference Fs in the amount of protrusion is greater than −0.4 and less than 0.5,
when a sum Fa of the amounts of protrusions for each sidewall is obtained according to mathematical expression (2), and the sum Fa of the amounts of protrusions satisfies mathematical expressions (3) and (4) in which an aspect ratio A is used, and
when a difference Gs in the amount of protrusion for the tread is obtained according to mathematical expression (5), and the difference Gs in the amount of protrusion satisfies mathematical expressions (6) and (7)

$$Fs=((Dd-De)/W)\times 100 \quad (1)$$

$$Fa=((Dd+De)/W)\times 100 \quad (2)$$

$$0.02626\times A-1.8615<Fa \quad (3)$$

$$Fa<0.02626\times A-0.6615 \quad (4)$$

$$Gs=((Da-Dh)/W)\times 100 \quad (5)$$

$$-0.010819\times A-0.084658<Gs \quad (6)$$

$$Gs<-0.010819\times A+0.6713 \quad (7).$$

7. The durability evaluation method according to claim 6, wherein evaluation is determiend as being good when the difference Gs in the amount of protrusion satisfies mathematical expressions (8) and (9)

$$-0.010819\times A+0.108321<Gs \quad (8)$$

$$Gs<-0.010819\times A+0.478321 \quad (9).$$

8. A manufacturing method for a tire which comprises: a tread having an outer surface that forms a tread surface; a pair of sidewalls that extend almost inward from ends, respectively, of the tread in a radial direction; a carcass that is extended along inner sides of the tread and the sidewalls; and a belt that is disposed outward of the carcass in the radial direction and layered over the carcass, the belt having an inner layer, and an outer layer disposed outward of the inner layer in the radial direction and layered over the inner layer, the manufacturing method for the tire comprising the step of:
determining and evaluating durability of a sample tire, wherein
in the determining and evaluating of durability,
a position, on an equator plane, of the tread surface is represented as a point Pa,
positions, on the tread surface, which are distant from each other by 0.8 times a width Wb, in an axial direction, of a region where the inner layer and the outer layer of the belt are layered over each other, are each represented as a point Ph,
positions, on axially outer side surfaces of the sidewalls, which are distant from each other with a maximum width, are each represented as a point Pe,
positions, on the axially outer side surfaces of the sidewalls, each of which is a midpoint between the point Pa and the point Pe in the radial direction, are each represented as a point Pd,
a nominal width is represented as W (mm),
in a case where, in an internal pressure state where an internal pressure that is 0.05 times a normal internal pressure P has been increased to the normal internal pressure P, an amount of protrusion at the point Pa is represented as an amount of protrusion Da (mm), an amount of protrusion at the point Ph is represented as an amount of protrusion Dh, an amount of protrusion at the point Pd is represented as an amount of protrusion Dd (mm), and an amount of protrusion at the point Pe is represented as an amount of protrusion De (mm), and
it is determined that
when a difference Fs in the amount of protrusion for each sidewall is obtained according to mathematical expression (1), the difference Fs in the amount of protrusion is greater than −0.4 and less than 0.5,
when a sum Fa of the amounts of protrusions for each sidewall is obtained according to mathematical expression (2), the sum Fa of the amounts of protrusions satisfies mathematical expressions (3) and (4) in which an aspect ratio A is used, and
when a difference Gs in the amount of protrusion for the tread is obtained according to mathematical expression (5), the difference Gs in the amount of protrusion satisfies mathematical expressions (6) and (7), and
wear resistance of the tread and crack resistance in grooves are evaluated based on the determination, and
the tire is designed and manufactured based on an evaluation result in the determining and evaluating of durability $$Fs=((Dd-De)/W)\times 100 \quad (1)$$

$$Fa=((Dd+De)/W)\times 100 \quad (2)$$

$$0.02626\times A-1.8615<Fa \quad (3)$$

$$Fa<0.02626\times A-0.6615 \quad (4)$$

$$Gs=((Da-Dh)/W)\times 100 \quad (5)$$

$$-0.010819\times A-0.084658<Gs \quad (6)$$

$$Gs<-0.010819\times A+0.6713 \quad (7).$$

9. The tire according to claim 2, comprising
a band disposed outward of the belt in the radial direction and layered over the belt, wherein
the band includes a first band, and a second band layered over the first band,
the first band includes a cord and a topping rubber, and the cord extends substantially in the circumferential direction, and
the second band includes a cord and a topping rubber, and an absolute value of a tilt angle of the cord relative to the equator plane is greater than or equal to 80°, and not greater than 90°.

10. The tire according to claim 2, wherein
the aspect ratio A is 70%,
the sum Fa of the amounts of protrusions is greater than −0.02 and less than 1.18, and
the difference Gs in the amount of protrusion is greater than −0.84 and less than −0.09.

11. The tire according to claim 3, wherein
the aspect ratio A is 70%,
the sum Fa of the amounts of protrusions is greater than −0.02 and less than 1.18, and
the difference Gs in the amount of protrusion is greater than −0.84 and less than −0.09.

12. The tire according to claim 2, wherein
the aspect ratio A is 40%,
the sum Fa of the amounts of protrusions is greater than −0.81 and less than 0.39, and the difference Gs in the amount of protrusion is greater than −0.52 and less than 0.24.

13. The tire according to claim 3, wherein the aspect ratio A is 40%, the sum Fa of the amounts of protrusions is greater than −0.81 and less than 0.39, and the difference Gs in the amount of protrusion is greater than −0.52 and less than 0.24.

\* \* \* \* \*